July 14, 1931. L. R. HARTLEY 1,814,153
MEASURING AND DISPENSING PUMP
Filed Oct. 2, 1926 7 Sheets-Sheet 3

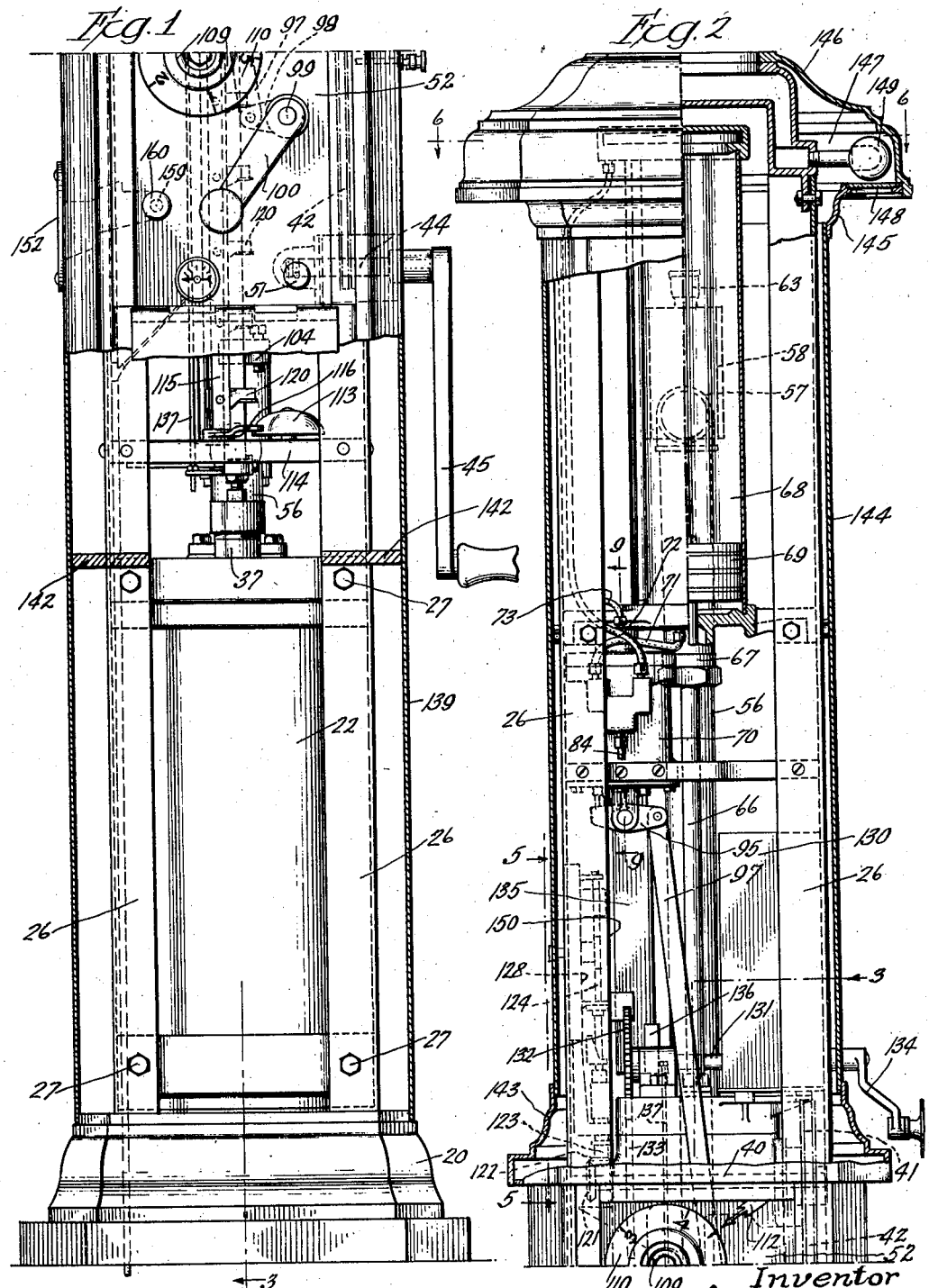

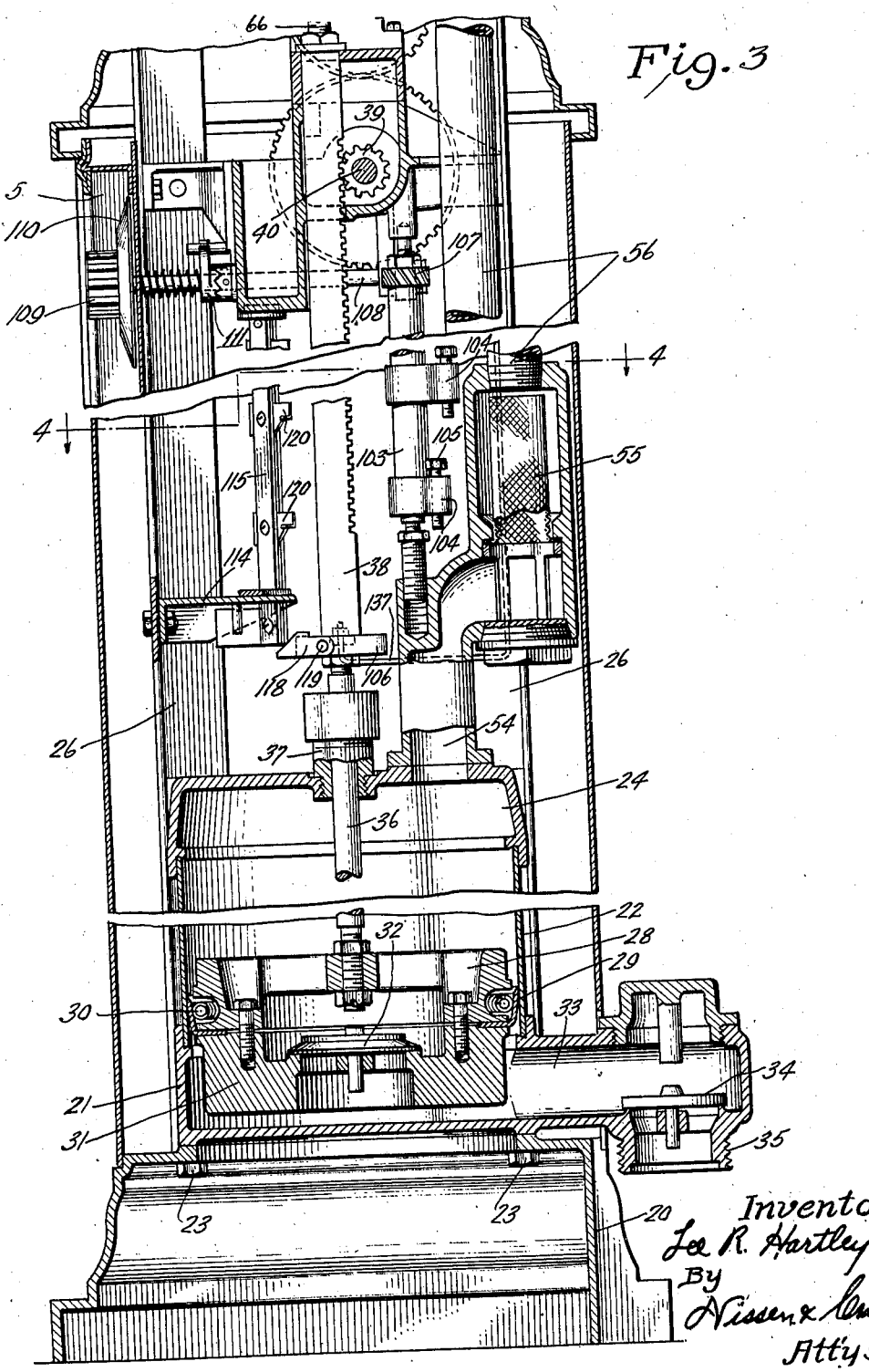

Inventor
Lee R. Hartley
By Nissen & Crane
Attys.

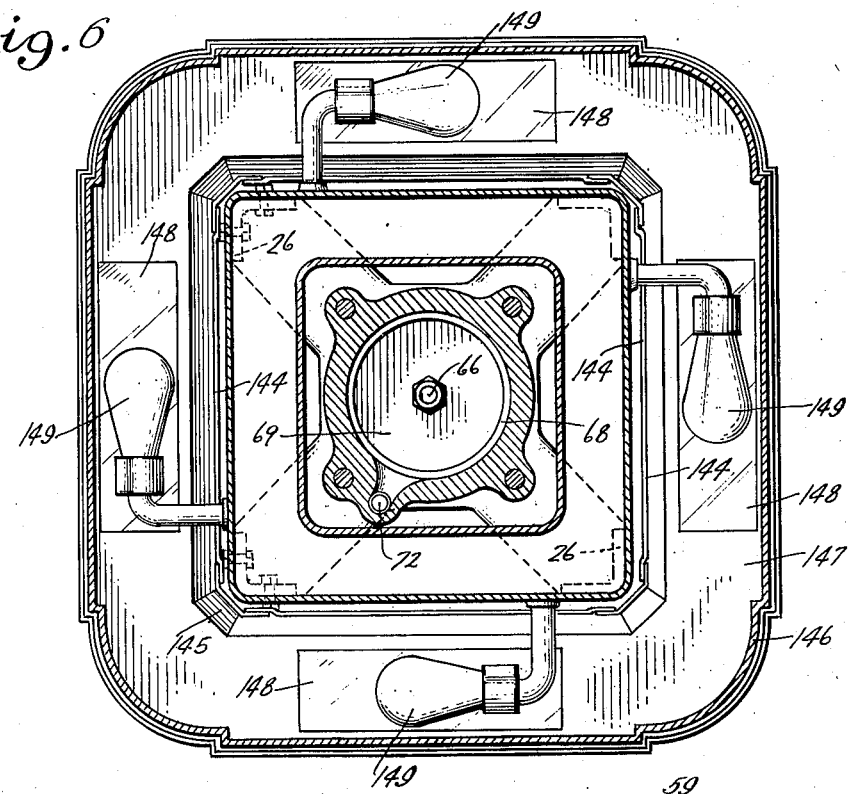
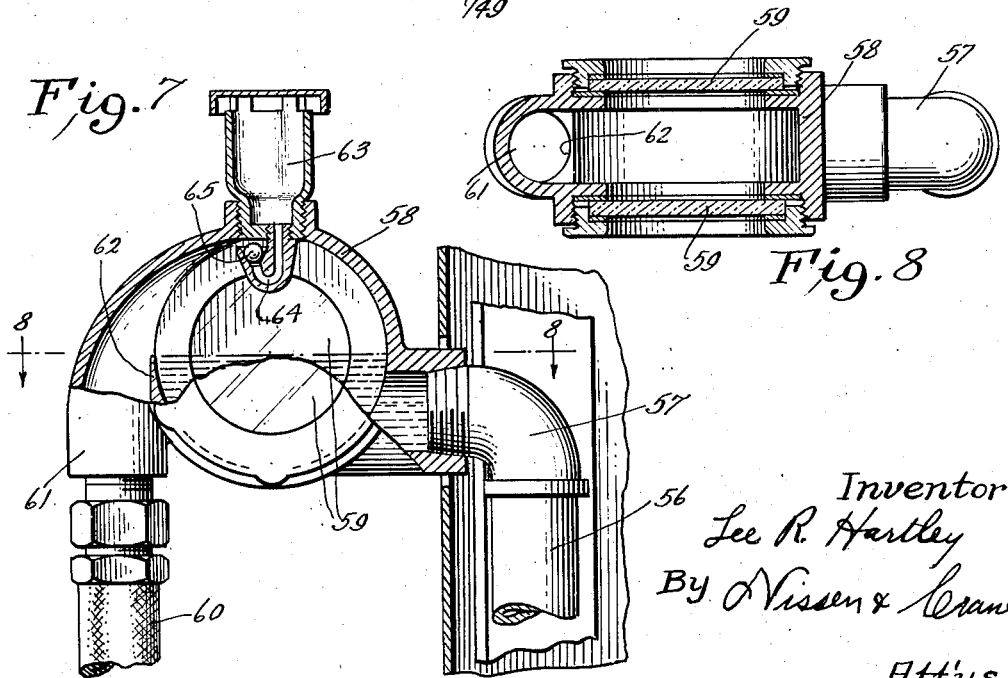

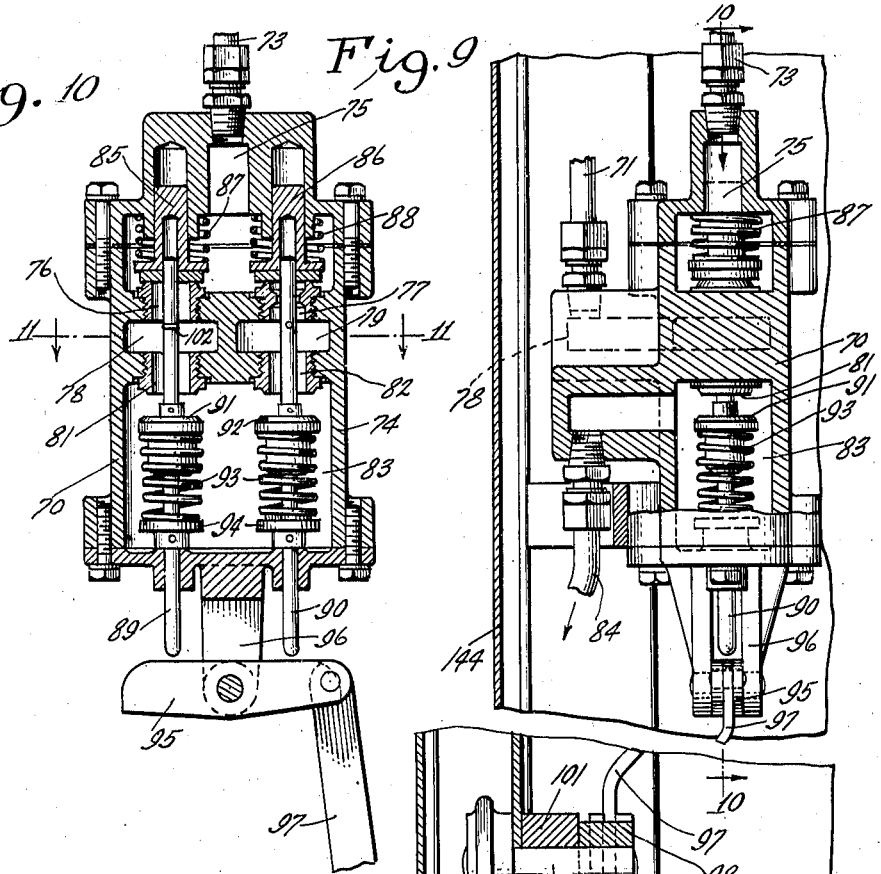

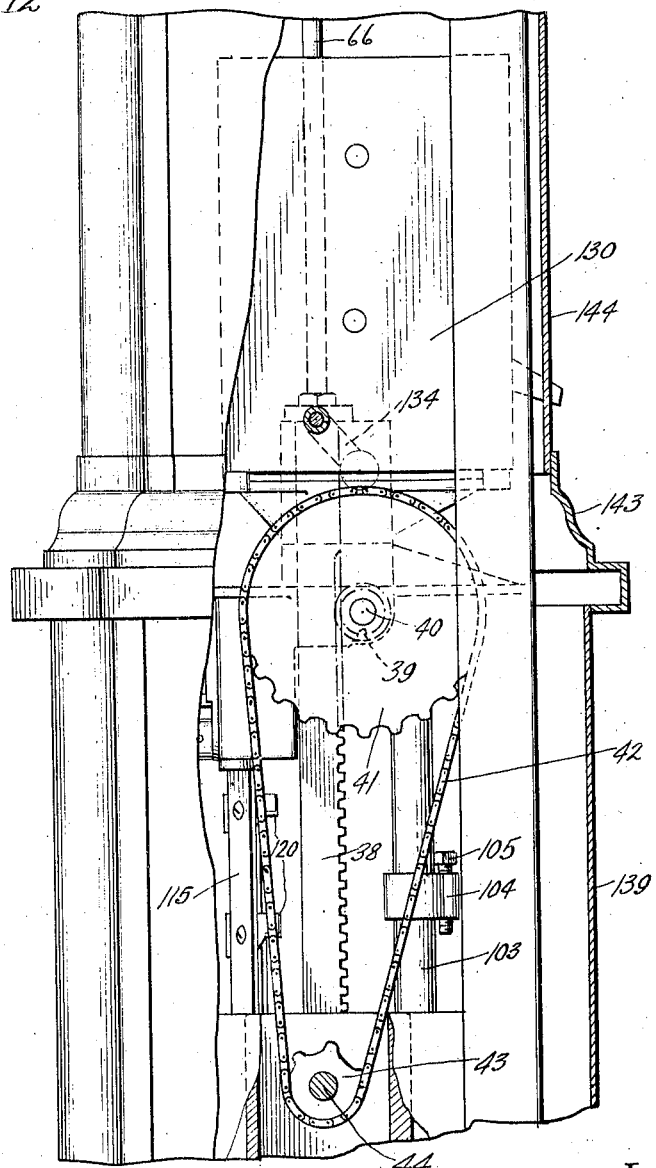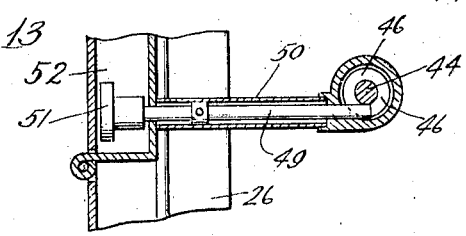

Patented July 14, 1931

1,814,153

UNITED STATES PATENT OFFICE

LEE R. HARTLEY, OF FORT WAYNE, INDIANA, ASSIGNOR TO S. F. BOWSER & COMPANY, INC., OF FORT WAYNE, INDIANA, A CORPORATION OF INDIANA

MEASURING AND DISPENSING PUMP

Application filed October 2, 1926. Serial No. 139,071.

This invention relates to pumps for measuring and dispensing liquids such as gasoline, and has for one of its objects the provision of a dispensing pump having a frame construction which is adapted to support driving mechanism of different kinds for operating the pump.

A further object is to provide a pump having its operating mechanism supported on a skeleton frame and enclosed in an outer casing which is provided with removable panels to permit access to the operating mechanism.

A further object is to provide a pump of improved appearance and having improved lighting arrangement.

A further object is to provide a pump having improved means for measuring and registering the amount of liquid dispensed, and having improved means for indicating to the customer that the pump is being properly operated and correct measure is given.

A further object is to provide a pump having improved construction and operation which may be economically manufactured and which will guard both the customer and owner against fraudulent operation on the part of the operator.

Other objects will appear from the following description.

The invention is exemplified in the combination and arrangement of parts shown in the accompanying drawings and described in the following specification, and it is more particularly pointed out in the appended claims.

In the drawings,

Fig. 1 is an elevation of the lower portion of a dispensing pump made according to the present invention, having a portion of the housing broken away to disclose the inner parts.

Fig. 2 is a view similar to Fig. 1, showing the upper portion of the pump.

Fig. 3 is a section on the line 3—3 of Figs. 1 and 2.

Fig. 6 is a section on line 6—6 of Fig. 2.

Fig. 7 is an elevation of the sight feed with parts in section.

Fig. 8 is a section on line 8—8 of Fig. 7.

Fig. 9 is a section on line 9—9 of Fig. 2.

Fig. 10 is a section on line 10—10 of Fig. 9.

Fig. 11 is a section on line 11—11 of Fig. 10.

Fig. 12 is an end elevation of the central portion of the pump with a part of the casing broken away to show the hand drive.

Fig. 13 is a section on line 13—13 of Fig. 4.

Figure 4:
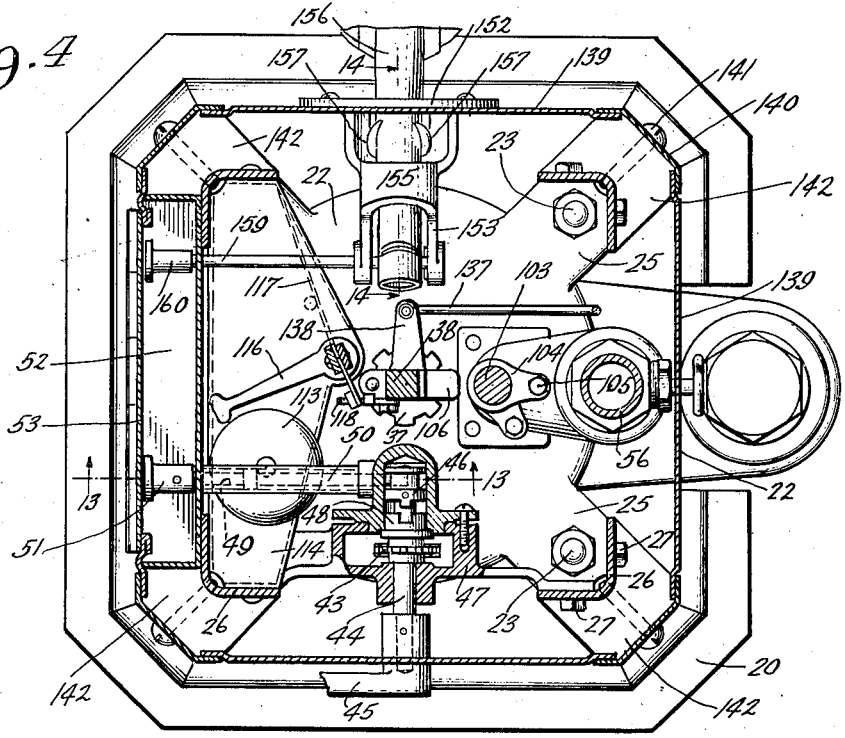
Fig. 4 is a section on line 4—4 of Fig. 3.

In the embodiment of the invention shown in the drawings the numeral 20 designates a supporting base having an end casting 21 for a pump cylinder 22 secured thereto by bolts 23. The cylinder 22 is provided with a top end casting 24, and the end castings 21 and 24 have projecting lugs 25 (Fig. 4) through which the bolts 23 extend to hold the end castings against the cylinder 22 and to secure the cylinder to the base 20. The operating mechanism for the pump is supported on a skeleton frame comprising four upright angle bars 26, which are secured to the projections 25 by cap screws 27. A piston 28 is arranged to move in the cylinder 22 and is provided with a leather or ring 29 for forming a tight connection between the piston and cylinder. A spring 30 is provided for holding the leather against the inner wall of the cylinder. The piston is weighted by a comparatively heavy member 31 to insure its downward return movement in the cylinder. A valve 32 permits the piston to move freely downwardly into liquid contained in the cylinder, but causes the piston to lift the liquid in the cylinder when the piston is raised. The cylinder is provided with an inlet port 33 controlled by a valve 34 to prevent return movement of the liquid being pumped. The valve 34 is provided with a connection 35 for connecting the valve to any suitable source of supply such as an underground storage tank. A piston rod 36 is connected to the piston 28 and extends upwardly through a packing gland 37. A rack 38 is connected to the upper end of the piston rod 36 and meshes with a pinion 39 secured to a shaft 40. The shaft 40, as shown in Figs. 2 and 12, is provided with a sprocket wheel 41 over which a chain 42 passes. The chain 42 engages a pinion 43 on the shaft 44. As shown in Figs. 1 and 4, the shaft 44 is provided with a hand crank 45, and a clutch member 46 is fixed to the inner end of the shaft. The shaft 44 is journaled in a bracket 47 secured to the angle bars 26 and the shaft is slidable longitudinally in its bearing. The shaft moves freely through the sprocket wheel 43, which is free to rotate on the shaft. The sprocket wheel 43 carries a clutch member 48, which engages the clutch member 46 when the shaft is drawn outward. When the clutch members 46 and 48 are in engagement rotation of the hand crank 45 will drive the pinion 43 and the sprocket wheel 41 and thus rotate the shaft 40 to raise the rack 38 and piston 28. During the pumping operation after the piston has been raised to its uppermost limit, it may be released by pushing in on the hand crank 45 to permit the piston to return by gravity without the necessity of reversing the rotation of the hand crank. The clutch member 46 is provided with a peripheral notch in position to be engaged by a pin 49, which is mounted for endwise sliding movement in the tubular guide 50. The pin 49 is provided with a knob 51 by means of which the pin may be slid into and out of engagement with the clutch 46. When the knob is pushed inwardly, as shown in Figs. 4 and 13, the shaft 44 will be locked against endwise movement so that the hand crank 45 is held out of operating connection with the sprocket 43. The knob 51 is enclosed in a recess or compartment 52 having a door 53 by means of which the compartment is closed. When the door 53 is closed as shown in Fig. 4, the knob 51 will be retained in its innermost position for preventing operation of the pump by the handle 45.

The upper end of the cylinder 22 is provided with a discharge opening 54, through which the liquid is discharged from the cylinder when the piston 28 is raised. A screen or filter 55 may be placed in the passage from the discharge opening 54, and a conduit 56 leads upwardly from the screen chamber and is provided with an L 57 at its upper end, which as shown in Fig. 7, connects with a sight feed 58 disposed outside the pump housing. The sight feed 58 is provided with transparent side walls 59, by means of which the liquid may be seen to pass through the feed when the pump is operated. A discharge hose 60 is secured to an outlet portion 61 of the sight feed 58 and an overflow wall 62 is interposed between the inner chamber of the sight feed and the discharge portion 61, to cause the liquid to stand at a definite level within the sight feed. This liquid level will indicate whether or not the pump is in proper condition to discharge the correct amount of liquid when the piston is raised. If the liquid level is not at the proper height in the sight feed, it is evident that the pump is not in condition to discharge the correct amount, since it will be necessary to bring the surface level to the proper height before it will begin to discharge to the customer. If, for instance, there are leaky valves in the pump which permit the liquid to drain from the pump back to the storage tank, this fact will be indicated by lowering of the surface level in the sight feed. The sight feed is provided with a vent 63 having a curved passage 64 communicating with the interior of the sight feed and closed against escape of liquid by a ball valve 65. The ball valve 65 will close against escape of liquid from the sight feed, but will open to prevent vacuum in the sight feed in order to permit the liquid to drain from the hose 60.

The upper end of the rack 38 is secured to an operating rod 66 which passes through a packing gland 67 into an air cylinder 68. A piston 69 is secured to the rod 66 within the cylinder 68. By admitting compressed air to the lower end of the cylinder 68 below the piston 69 the pump may be operated by pneumatic pressure independently of the hand crank 45. When the pressure is released beneath the piston 69, the weight of the parts will cause the piston to return to its lowermost position. In the construction illustrated means is provided for introducing air into the top end of the cylinder to assist in the return movement. The passage of air to and from the cylinder 68 is controlled by a valve 70 connected by a pipe 71 to the lower end of the cylinder 68 and by a pipe 72 to the upper end of the cylinder. A connection 73 is provided with any suitable source of compressed air such as an air pump or a storage tank, for supplying pneumatic pressure to the valve 70. The operation of the valve will best be understood from Figs. 9, 10 and 11. The valve comprises a housing member 74 having a chamber 75 connected with the supply pipe 73 and having passages 76 and 77 communicating through chambers 78 and 79 respectively with the pipes 71 and 72. The passage 77 is more restricted than the passage 76 as the passage 77 controls admission of air to the upper end of the cylinder through the pipe 72 and less pressure is required to return the piston than is required for the pumping stroke. The chambers 78 and 79 are connected by passages 81 and 82, respectively, with chamber 83, which is open to atmosphere through a vent 84. Valves 85 and 86 are slidably mounted in guideways formed in the housing 74 and are pressed by springs 87 and 88 into position to close the passages 76 and 77 respectively, thus normally preventing the entrance of air under pressure from the pipe 73 to the ends of the cylinder 68. The plungers 89 and 90 are slidably mounted in openings in the valves 85 and 86 and extend through guide openings in the end of the housing 74. Valves 91 and 92 are mounted on the plungers 89 and 90 in position to close the passages 81 and 82 when the plungers are raised. The valves 91 and 92 are free to slide on their respective plungers and are held in position by springs 93 which bear against collars 94 fixed to the respective plungers. A lever 95 is pivoted on a bracket 96 in position to engage the plungers 89 and 90 to lift one or the other of the plungers when the lever is moved upon its pivot. The lever 95 is connected by a link 97 to an arm 98 secured to a stud shaft 99 having a hand crank 100 connected thereto. The stud shaft 99 is journaled in a bearing 101 mounted on the inner wall of the compartment 52, and the handle 100 is disposed within the compartment 52 so that access thereto may be prevented when the door 53 is closed. It will be apparent that movement of the handle 100 in one direction will raise one or the other of the plungers 89 and 90. When it is desired to operate the pump the handle 100 is turned in the proper direction to raise the plunger 89. This will first lift the valve 91 into engagement with its valve seat to close the passage 81. Further movement of the handle 100 will compress the spring 93 and hold the valve 91 tightly against its seat under spring tension. Further movement of the handle 100 will bring the end of the plunger 89 against the valve 85 and open the passage 76 to permit air under pressure to enter through the pipe 71 into the lower end of the cylinder 68, thus raising the piston 69 and operating the pump. As long as the handle 100 is held in its operative position the piston 69 will be held in its raised position by the compressed air beneath the piston. To return the piston the handle 100 will be moved in the opposite direction, which will first permit the valve 85 to close, shutting off the air supply from the cylinder 68. Further movement will open the valve 91, connecting the cylinder 68 to atmosphere. The weight of the pump piston and connected parts will then return the piston to its lowermost position. This return movement may be hastened by moving the handle 100 in the opposite direction from which it is moved to operate the pump, which will raise the plunger 90 and admit air to the top of the cylinder 68, the valve mechanism operating in a manner similar to that previously described in connection with the admission of air to the lower end of the cylinder; see Fig. 10.

In order to discharge predetermined amounts of gasoline to the customer a series of limit stops are provided for arresting the upward movement of the piston at predetermined points in its upward travel. A stop rod 103 is journaled to rotate about an upright axis and carries stop arms 104 having adjustable stop screws 105 threaded therein. The arms 104 extend at different angles about the stop rod 103 and may be selectively rotated into the path of the stop lug 106 secured to the lower end of the rack 38. The rod 103 carries a pinion 107, which meshes with a worm on the shaft 108 extending into the compartment 52 and is provided with a knob 109 and a dial 110 to indicate the position of the stops 104. A spring detent 111 is provided for arresting the rod 103 with the stops thereon in registration with the lug 106 on the rack 38. A pointer 112 (Fig. 2) is provided for indicating the particular stop in registration with the lug 106. The stops 104 are distributed to arrest the upward movement of the pump piston when a predetermined quantity of liquid has been discharged. A stop may be provided for each gallon of liquid discharged. In operation, the dial 110 will be set to indicate the number of gallons desired and the handle 100 moved in the proper direction to operate the air piston and lift the pump rack until it is arrested by the stop corresponding to the number of gallons desired. Reverse movement of the handle will then return the piston in the manner previously described. In case of failure of the air pressure or for any other reason, the pump may be operated by hand. The air piston will not interfere with the hand operation since in its neutral position both ends of the air cylinder are open to atmosphere.

An audible signal is preferably provided for indicating the number of gallons discharged. This signal comprises a bell 113 mounted on a bracket 114 secured to the angle bars 26, as shown in Figs. 1 and 4. A bar 115 is disposed in the bracket 114 and carries a tapper 116 arranged to strike the bell 113. A spring 117 (Fig. 4) normally holds the tapper in position closely adjacent the bell. A cam lug 118 (Fig. 3) is pivoted at 119 on the stop member 106 and contacts 120 are carried by the bar 115 in the path of the cam lug 118. As the cam lug 118 passes the contacts 120 on the upward movement of the rack 38 the bar 115 will be rotated against the tension of the spring 117, and as the cam lug moves out of engagement with the contacts 120 the bar 115 will be released and the tapper 116 will strike the bell. The parts are so adjusted that the bell will be sounded each time the lug 106 reaches one of the contacts 104; that is, the bell will audibly indicate each gallon of liquid pumped.

Figure 5:
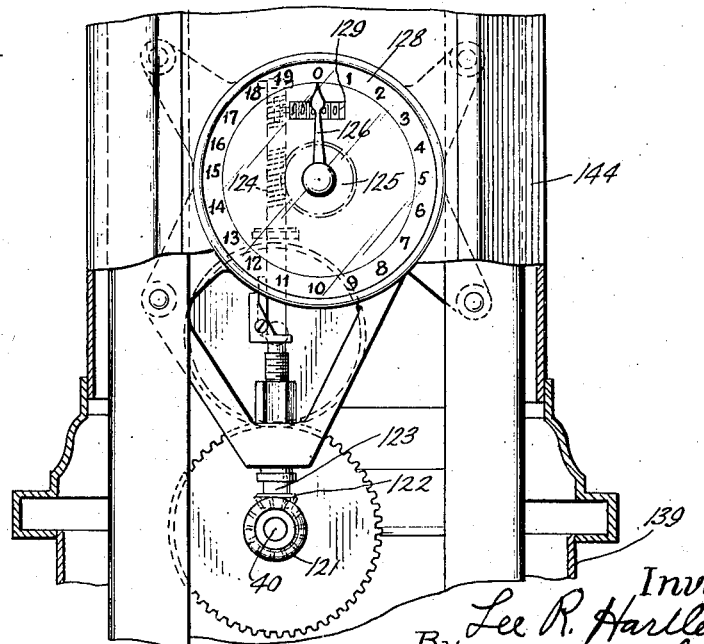
Fig. 5 is an elevation on line 5—5 of Fig. 2, with parts broken away.

In order to visibly indicate the amount of liquid pumped at each operation of the pumping apparatus and keep a record of the total amount pumped, an indicator shown in Fig. 5, is operatively connected with the shaft 40 which is connected by pinion 39 with the rack 38. The shaft 40 is provided with a bevel pinion 121, which meshes with a bevel pinion 122 on the upright shaft 123. The shaft 123 is provided with a worm 124 which meshes with a worm wheel 125 having a pointer 126 connected therewith to travel over a dial 128, the parts being so proportioned that the pointer 126 will indicate on the dial the number of quarts or other units of liquid pumped during any upward stroke of the rack 38. The pointer 126 may be provided with a spring for returning it to zero and have a releasable connection with its spindle controlled by a knob at the end of the spindle so that by pressing the knob the pointer will return to zero. Any suitable form of totalizing mechanism or counter 129 may be operated by the shaft 123 for indicating the total number of gallons pumped during a given period or until the totalizer is reset.

The pump is also preferably provided with a printing register of any well known or approved form housed in the casing 130 and driven by a shaft 131, which carries a gear 132 meshing with a gear 133 on the shaft 40 as shown in Fig. 2. The rotation of the shaft 131 driven from the shaft 40 will set up the printing mechanism to print a ticket indicating the number of gallons pumped, and a crank 134 is connected with the printing mechanism to operate the printing mechanism and issue a ticket. The particular form of printing and ticket issuing mechanism is not described in detail as it is not a part of the present invention except in combination with the dispensing pump.

Figure 15:
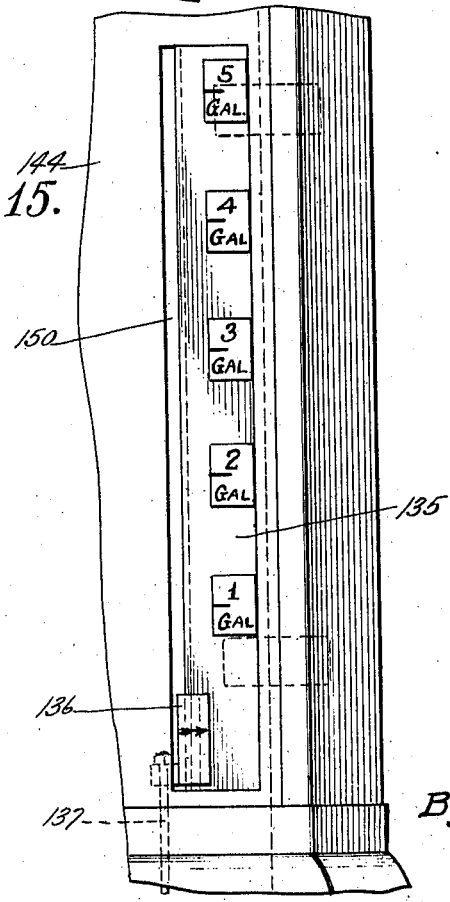
Fig. 15 is a fragmentary elevation of the quantity indicator.

The position of the rack 38 and consequently the number of gallons pumped is shown on the indicator 135 having a slide 136 connected by a rod 137 to an arm 138 secured to the rack 38 as shown in Figs. 3 and 15. The indicator 135 is preferably arranged to indicate gallons, while the indicator 128 may be graduated to indicate quarts. It will be seen that the cylinder 68 and the other operating parts are carried by brackets bolted to the main frame members 26. This construction makes it conveniently possible to remove the power drive and replace it by a power drive of another kind, if desired. For instance, the pneumatic cylinder may be easily removed from the supporting frame and an electric drive substituted, such as that shown in my copending application Serial No. 140,702, filed October 11, 1926, for an improvement in motor operated dispensing pumps. Where such substitution is made the pump cylinder, rack and shaft 40 will be retained and the other driving mechanism mounted on the supporting angle bars 26 in the upper portion of the pump casing. The provision of a skeleton frame which supports the operating mechanism independently of the pump proper makes such substitution easily possible and commercially practicable. This is a great advantage in the manufacture of a line of pumps as it permits the use of standard parts for a variety of styles of pumps suitable for operation under various conditions. It also permits a pump which has once been installed to be readily transformed from a hand operated to a power driven pump, or from a power driven pump of one kind to a power driven pump of another. When the available form of power is changed this permits the adaptation of the old pump to a new power without the necessity of installing a new pump. The skeleton frame arrangement also lends itself to a pedestal form of pump of attractive appearance since the operating mechanism may be closed in a housing consisting of sheet metal panels detachably mounted on the skeleton frame and easily removable in sections to permit access to the operating mechanism. It will be seen in Fig. 4, for instance, that the sides of the housing comprise sheet metal panels 139, which are held to the base 20 by strips 140 and screws 141. Spacing brackets 142 may be secured to the angle bars 26 to hold the panels spaced outwardly from the angle bars. The upper portion of the housing is preferably of less width than the lower portion and a sheet metal molding member 143 connects the panels 144 of the upper portion with the panels 139 of the lower portion. The upper end panels 144 may be surrounded by a coping 145. A canopy 146 covers the top of the housing and is provided with a peripherally extending recess or opening 147 having glass plates 148 in the overhanging portion, above which are positioned electric light bulbs 149 for lighting the sides of the housing. This lighting arrangement obstructs the direct rays of light which otherwise would strike the eyes of the observer but throws the light on to the pump housing which makes the pump stand out distinctly and clearly without glare.

Figure 14:
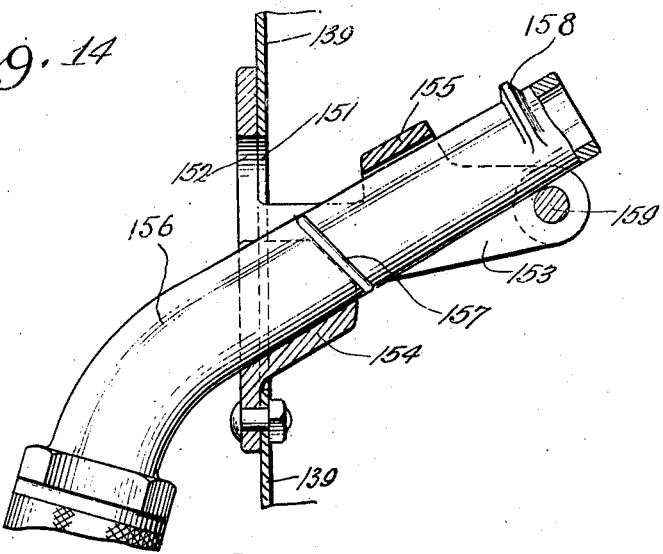
Fig. 14 is a section on line 14—14 of Fig. 4.

One of the upper panels 144 is provided with an opening 150 through which the indicator 135 is visible as shown in Fig. 15. One of the lower panels 139 has an opening 151 therethrough surrounded by a bracket member 152, as shown in Figs. 4 and 14. The bracket member has a pair of inwardly projecting arms 153, which are connected by a flange 154 and a bridge 155. The hose nozzle 156 is provided with ribs 157 for engaging the shoulders on the flange 154 to hold the nozzle in place. A locking pin 159 is arranged to extend through openings in the ends of the arms 153 to lock the nozzle in the bracket 152. The pin 159 is provided with a knob 160 disposed in the recess 52 to permit withdrawal of the pin 159 when the door 53 is opened so that the nozzle 156 may be removed from engagement with the bracket 152. When the pin 159 is in place the nozzle is locked in the bracket. The door 53 prevents withdrawal of the pin 159 when the door is closed and locked.

I claim:

1. A dispensing pump comprising a base, a pump cylinder mounted on said base, a piston arranged to reciprocate in said pump cylinder, a connecting rod projecting upwardly from said pump piston through the end of said pump cylinder, upright bars carried by said base and extending upwardly above said pump cylinder, a rack connected to said piston rod, a shaft having a pinion thereon meshing with said rack, a bearing member mounted on said upright bars in which said shaft is journaled, a hand crank for rotating said shaft, a clutch member for releasably connecting said hand crank with said shaft, a bracket detachably supported by said upright bars, a motor cylinder carried by said bracket, a piston arranged to reciprocate in said motor cylinder, a piston rod connecting said piston with said rack, and means for introducing fluid under pressure into said motor cylinder for operating said pump piston.

2. A dispensing pump comprising a pumping cylinder having a reciprocating weighted piston therein, a motor cylinder having a piston therein connected with the piston in said pumping cylinder, means for introducing air under pressure below the piston in said motor cylinder to effect a pumping stroke of the piston in said pumping cylinder, said pistons being free to return to their initial position upon release of pressure beneath said motor piston, and means for introducing air in said motor cylinder above said motor piston to assist the action of gravity in returning said pistons to their initial position.

3. The combination with a reciprocating pump, of a fluid pressure actuated piston for operating said pump, a cylinder in which said piston reciprocates, means for introducing fluid under pressure into said cylinder at opposite sides of said piston to effect a pumping movement to said reciprocating pump when said piston moves in one direction and a return movement of said pump when said piston moves in the opposite direction, the passage to said cylinder for effecting the return movement of said pump having less capacity than the passage for introducing pressure fluid for effecting a pumping movement of said pump.

4. The combination with a vertically reciprocating pump, of a fluid pressure motor comprising a piston and cylinder for operating said pump, means for introducing pressure fluid beneath said piston to effect a pumping movement of said pump, said piston being free to return by gravity on release of the pressure beneath said piston, and means for introducing fluid under pressure above said piston to assist gravity in effecting a return stroke of said pump, the passage for introducing pressure beneath said piston having a greater capacity than the passage for introducing pressure fluid above said piston.

5. The combination with a reciprocating pump, of a fluid pressure motor for operating said pump, said motor comprising a cylinder and a piston therein, a source of fluid pressure supply for said motor, a valve comprising a casing having a chamber therein connected with said source of supply, said casing having separate ports connected with opposite ends of said motor cylinder respectively, said ports being normally open to atmosphere, valves for closing said ports to atmosphere, a handle for operating said valves, and plungers controlled by said handle for closing one of said ports to atmosphere and connecting said port with said fluid pressure supply when said handle is moved in one direction and for closing the other of said ports to atmosphere and connecting said port with said source of supply when said handle is moved in the opposite direction.

6. The combination with a reciprocating pump, of a fluid pressure motor for operating said pump comprising a cylinder having a reciprocating piston therein, a source of fluid supply for operating said piston, a double valve for controlling the admission of fluid pressure to the opposite ends of said cylinder respectively, said valve having ports therein connected with the opposite ends of said cylinder respectively and normally open to atmosphere, means operable in one direction for closing one of said ports to atmosphere and thereafter connecting said port with one end of said cylinder, said means being movable in the opposite direction past a neutral position in which both of said ports are open to atmosphere for closing the other of said ports to atmosphere and thereafter connecting said port with said source of fluid supply.

7. The combination with a dispensing pump, of a fluid pressure motor for operating said pump, said motor comprising a cylinder and a reciprocating piston therein, a source of fluid pressure supply for operating said motor, a valve casing having a chamber connected with said source of supply, a pair of ports in said casing connected with opposite ends of said cylinder respectively, valves for closing the openings between said pressure chamber and said ports, said ports having exhaust openings, valves for closing said exhaust openings, separate plungers for operating the valves for controlling the openings connected with said respective ports, manually actuated means operable in opposite directions for actuating said plungers respectively, said operating means having a neutral position in which both of said ports are connected to atmosphere, one of said plungers being operated by said manually actuated means when moved in one direction for closing one of said exhaust openings and connecting the corresponding port with said pressure chamber, said manually actuated means being operable when moved in the opposite direction for first restoring said first mentioned plunger to neutral position and thereafter actuating the other plunger for closing the exhaust opening connected with the other port and thereafter connecting said last named port with said pressure chamber.

8. The combination with a pump cylinder, of a reciprocating piston therein weighted to return the same by gravity to its initial lower position when released, operating mechanism for said reciprocating piston, means for arresting the upward stroke of the pumping piston to restrict the amount of liquid pumped thereby to a predetermined measured quantity, and means for controlling said operating mechanism to effect alternate upward strokes by power and downward strokes by gravity acting on said weighted piston.

9. In dispensing apparatus, the combination with dispensing mechanism comprising a delivery hose with a nozzle connected thereto, of a housing for said dispensing mechanism, means in said housing for supporting said nozzle in inoperative position, a hand crank for operating said dispensing mechanism, means comprising a locking pin for locking said hand crank in inoperative position, means comprising another locking pin for locking said nozzle in inoperative position in said housing, a cabinet on the outer portion of said housing, knobs on the end of said locking pins in position in said cabinet, and a door for closing said cabinet and engaging said knobs to hold both of said locking pins in their locking positions when the door is closed.

In testimony whereof I have signed my name to this specification on this 23rd day of September, A. D. 1926.

LEE R. HARTLEY.